United States Patent [19]
Yagi et al.

[11] Patent Number: 5,125,001
[45] Date of Patent: Jun. 23, 1992

[54] SOLID LASER DEVICE

[75] Inventors: Shigenori Yagi; Kazuki Kuba; Junichi Nishimae; Takashi Yamamoto, all of Hyogo, Japan

[73] Assignee: Mitsubishi Denki K. K., Tokyo, Japan

[21] Appl. No.: 598,622

[22] PCT Filed: Feb. 15, 1990

[86] PCT No.: PCT/JP90/00182
§ 371 Date: Oct. 15, 1990
§ 102(e) Date: Oct. 15, 1990

[87] PCT Pub. No.: WO90/09690
PCT Pub. Date: Aug. 23, 1990

[30] Foreign Application Priority Data

Feb. 16, 1989 [JP] Japan ................................. 1-36917
Dec. 18, 1989 [JP] Japan ................................ 1-327692

[51] Int. Cl.$^5$ .............................................. H01S 3/08
[52] U.S. Cl. ......................................... 372/92; 372/95; 372/66; 372/99; 372/108
[58] Field of Search ................... 372/92, 95, 66, 99; 378/108, 98, 19

[56] References Cited

U.S. PATENT DOCUMENTS

| | | | |
|---|---|---|---|
| 4,423,511 | 12/1983 | Morton | 372/95 |
| 4,429,400 | 1/1984 | Kaye | 392/95 |
| 4,433,418 | 2/1984 | Smith | 373/95 |
| 4,559,627 | 12/1985 | Chun | 372/95 |
| 4,646,314 | 2/1987 | Opower | 372/95 |
| 4,953,175 | 8/1990 | DeSilvestri et al. | 372/95 |

Primary Examiner—Leon Scott, Jr.
Attorney, Agent, or Firm—Sughrue, Mion, Zinn, Macpeak & Seas

[57] ABSTRACT

This invention relates to a solid laser device with a slab-shaped laser medium. One example of a solid laser device according to the invention, comprises: a slab-shaped laser medium having one pair of optically smooth surfaces confronting each other through the optical path; first and second mirrors arranged on the optical path in such a manner that the first and second mirrors are confronted with each other through the laser medium; a resonator which forms an unstable resonator in the direction of width of the laser medium, and a low order stable resonator in the direction of thickness of the laser medium; and laser beam emergence medium for taking a laser beam out of the a resonator and outputting the laser beam from the device. Another example comprises: a slab-shaped laser medium having a pair of optically smooth surfaces confronting each other through the optical path; first and second mirrors arranged on the optical path in such a manner that the first and second mirrors are confronted with each other through the laser medium; a resonator which forms unstable resonators in the direction of width of the laser medium and in the direction of thickness of the same; and laser beam emergence medium for taking a laser beam out of the a resonator and outputting the laser beam from the device. Accordingly, the solid laser devices can output a high power laser beam excellent in convergence, thus being applicable to precision laser machining operations.

30 Claims, 7 Drawing Sheets

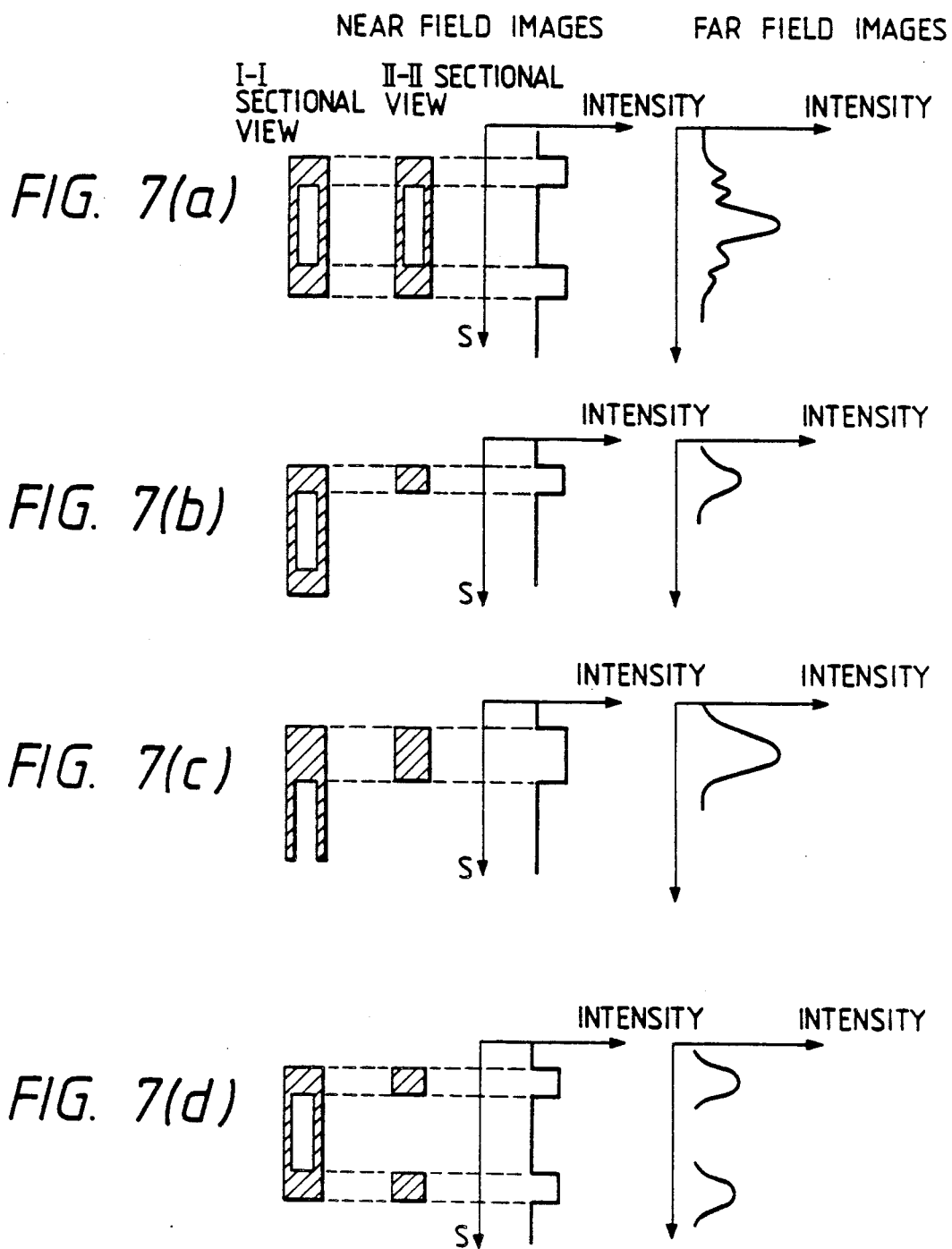

SOLID LASER DEVICE

TECHNICAL FIELD

This invention relates to solid laser devices, and more particularly to a solid laser device with a flat-plate-shaped laser medium.

BACKGROUND ART

A solid laser device is well known in the art in which a rod-shaped laser medium and a pumping lamp are positioned at the focal points of an elliptic reflecting box, respectively. In the solid laser device, a temperature distribution is established radially in the rod, so that the laser beam is subjected to the thermal lens effect and deteriorates in quality. This difficulty is serious for a high power laser. In order to overcome the difficulty, a solid laser device has been proposed in which a flat-plate-shaped laser medium (hereinafter referred to as "a slab-shaped laser medium", when applicable) is employed, and the optical path in the laser medium is zigzagged, so that thermo-optical distortions are canceled out in the laser medium.

One example of the above-described solid laser device has been disclosed by Japanese Patent Application (OPI) No. 254686/1985 (the term "OPI" as used herein means an "unexamined published application"). FIG. 1 is a sectional view showing the optical arrangement of the solid laser device. In FIG. 1, reference numeral 1 designates a slab-shaped laser medium having a pair of optically smooth surfaces 1a which are in parallel with each other, and end faces 1b forming an angle of inclination with the surfaces; 2, a total reflection mirror arranged near one of the end faces 1b of the laser medium 1; 3, a partially reflecting mirror arranged near the other end face 1b, forming a stable resonator with the total reflection mirror 2; 4, a lamp for applying a pumping light beam to the laser medium 1; 5, a reflecting box made of reflecting mirrors, the reflecting box 5 containing the lamp 4 and the laser medium 1; 6, the water in the reflecting box 5; 7, the optical axis of a laser beam; and 8, a laser beam outputted through the partially reflecting mirror 3. Further in FIG. 1, vectors P and S are defined with respect to the plane which is defined by the optical axis 7 and the incident surfaces 1b to the laser medium 1. The vector S is perpendicular to the plane, and the vector P is in parallel with the latter.

The solid laser device thus designed operated as follows. The output light beam of the lamp 4 is reflected in the reflecting box 5, and is absorbed by the laser medium 1 to excite the latter. As a result, the laser medium 1 emits a light beam. The light beam is reflected by the total reflection mirror 2. The light beam thus reflected enters the laser medium after being refracted at the end face 1b of the laser medium 1. In the laser medium 1, the light beam is repeatedly reflected by the upper and lower surfaces 1a, thus reaching the other end face 1b. At the end face 1b, the light beam is refracted again, and advances to the partially reflecting mirror 3. The light beam reflected from the partially reflecting mirror 3 returns to the optical axis 7. Therefore, the light beam is amplified while reciprocating along the optical axis 7. When the light beam is amplified to a predetermined degree, then part of the light beam passes through the partially reflecting mirror 3; that is, it is taken, as a laser beam, out of the stable resonator.

In the above-described solid laser device with the slab-shaped laser medium 1, the optically smooth surfaces of the laser medium 1 are kept cooled at all times. In the laser medium, the light beam advances zigzag being reflected by the upper and lower optically smooth surfaces; that is, laser beam passes alternately through the surface region of the laser medium which is at low temperature and the middle region of the laser medium which is at high temperature. Accordingly, the laser beam is not subjected to thermal lens effect, and a high power laser output can be stably obtained.

In the solid laser device described above, the laser medium 1 is generally rectangular; that is, the width in the direction S is about two to five times the thickness in the direction P. Therefore, the laser beam has a high order mode of rectangle shape, reflecting the section of the laser medium 1. For instance, in a solid laser device in which its laser medium 1 is a YAG (Yttrium Aluminum Garnet) crystal emitting a laser beam of 1.06 μm, the mode number in the direction P is several tens, and that in the direction S is several hundreds, and the beam divergence angle is up to several tens of milli-radians (mrad); that is, the laser beam is not sufficiently concentrated. Thus, while the above-described solid laser device can output a high power laser beam stably, the output laser beam is not sufficiently concentrated. That is, it is impossible for the laser beam to form a fine light spot. Accordingly, the application of the solid laser device to precision laser machining is limited.

Accordingly, an object of this invention is to eliminate the above-described difficulties accompanying a conventional solid laser device. More specifically, an object of the invention is to provide a solid laser device which can output a high power laser beam with excellent convergence, and can be applied to fine laser machining operations.

SUMMARY OF THE INVENTION

One example of a solid laser device according to the invention, comprises: a slab-shaped laser medium having one pair of optically smooth surfaces confronting each other through an optical path; first and second mirrors arranged on the optical path in such a manner that the first and second mirrors are confronted with each other through the laser medium; resonance means which forms an unstable resonator in the direction of width of the laser medium, and a low order stable resonator in the direction of thickness of the laser medium; and laser beam emergence means for taking a laser beam out of the resonance means and outputting the laser beam from the device. Another example comprises: a slab-shaped laser medium having a pair of optically smooth surfaces confronting each other through an optical path; first and second mirrors arranged on the optical path in such a manner that the first and second mirrors are confronted each other through the laser medium; resonance means which forms unstable resonators in the direction of width of the laser medium and in the direction of thickness of the same; and laser beam emergence means for taking a laser beam out of the resonance means and outputting the laser beam from the device, the laser beam emergence means functioning to shape the laser beam into a full filled stat laser beam. Accordingly, the solid laser devices can output a high power laser beam excellent in convergence, thus being applicable to precision laser machining operations.

DETAILED DESCRIPTION OF THE PREFERRED EMBODIMENTS

This invention will be described with reference to the accompanying drawings.

Figure 1:
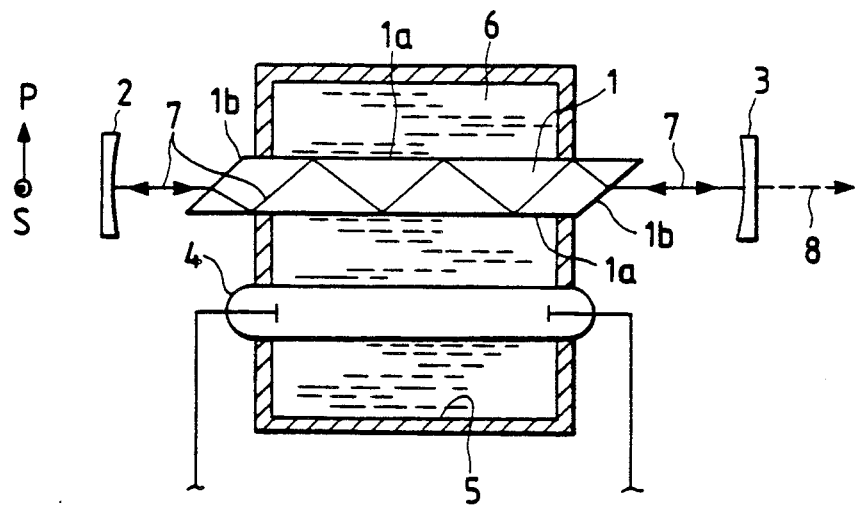
FIG. 1 is a vertical sectional view showing essential components of a conventional solid laser device.
Figure 2A:
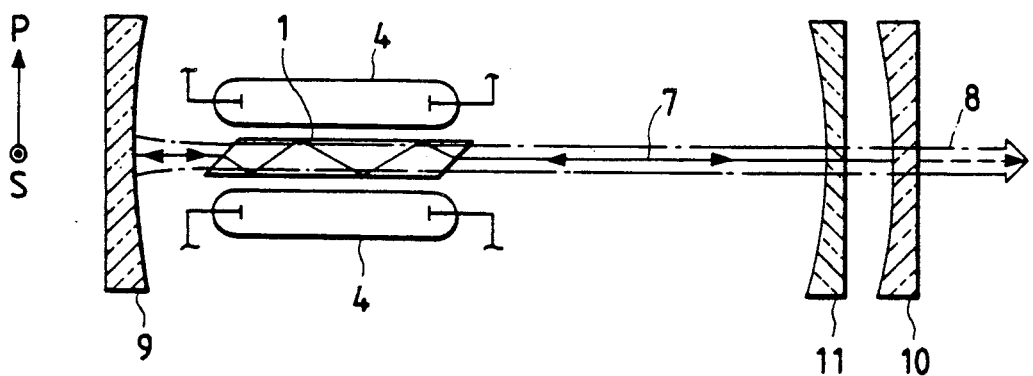
FIGS. 2(a) and 2(b) are a vertical sectional view and a horizontal sectional view, respectively, showing essential components of a solid laser device according to a first embodiment of the invention.
Figure 2B:
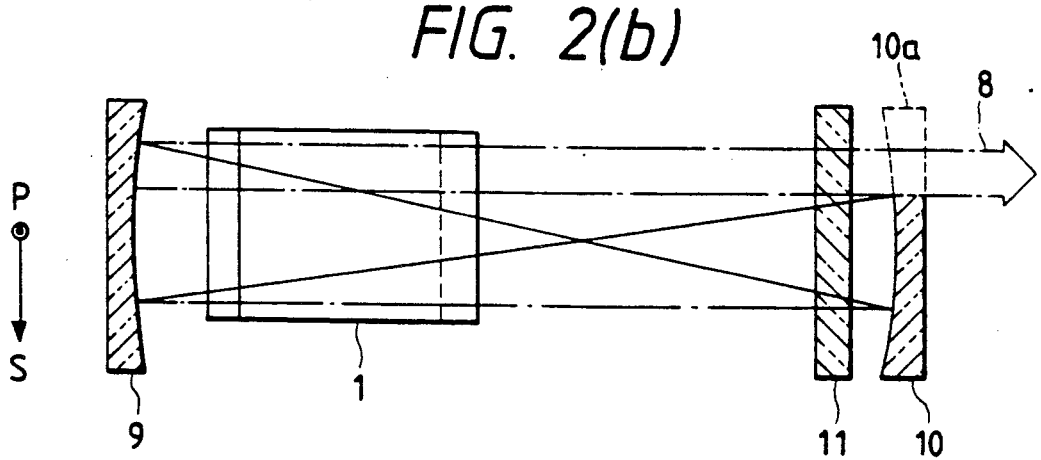

FIGS. 2 (a) and 2 (b) are a vertical sectional view and a horizontal sectional view, respectively, showing essential components of a solid laser device according to a first embodiment of the invention. In FIG. 2, reference numerals 1, 4, 7 and 8 designate the same parts as those in FIG. 1 showing the conventional solid laser device.

Further in FIG. 2, reference numeral 9 designates a collimate mirror of a total reflection mirror; 10, a concave mirror with a cut 10a in the direction opposite to the direction S, serving as an output mirror of a resonance system; and 11, a cylindrical lens which serves as a concave lens for the plane P and as a plane plate for the plane S. The cylindrical lens 11 is positioned between the concave mirror 10 and the laser medium 1. The total reflection mirror 9, the cylindrical lens 11, and the concave mirror 10 forms low order stable resonance means in the direction of the plane P (the direction of the thickness of the laser medium 1) and negative branch unstable resonance means in the direction of the plane S (in the direction of the width of the laser medium 1). The spherical curvatures of the total reflection mirror 9 and the concave mirror 10 are of symmetrically rotational and the cylindrical lens 11 is a linear lens.

The solid laser device according to the first embodiment of the invention is designed as described above.

Now, the resonance means in the directions of the planes P and S of the laser medium 1 will be described.

First, the stable resonance means in the direction of the plane P will be described (see FIG. 2 (a)). As the cylindrical lens 11 is disposed in front of the concave mirror 10, the curved surface of the concave mirror can be substantially regarded as a planar surface when viewed from the total reflection mirror 9. Therefore, in the fundamental mode, the beam is large in diameter, thus becoming a laser beam 8 small in mode number, for instance the 0-th mode. Thus, the stable resonance means is a low order stable resonance means small in the angle of divergence in the direction of the plane P.

Next, the unstable resonance means in the direction of the plane S will be described (see FIG. 2 (b)). In the direction of the plane S, the cylindrical lens 11 is planar, and therefore wave-optically the cylindrical lens can be disregarded. As shown in FIG. 2 (b), the laser beam is outputted through the cut 10a of the concave mirror 10, which is on one side of the optical axis 7 of the laser. When the unstable resonance means formed in the direction of the plane S is symmetrical in the direction of the plane S with respect to the medium, the laser beams are outputted from both ends of the medium and interefere with each other so that the angle of divergence is slightly widened. However, in the present invention, the resonance mirrors 9 and 10 are slanted in the direction of the plane S to that a full filled plane wave in the direction of the plane S is outputted from one end of the medium. Thus, the angle of divergence in the direction of the plane S is very small.

As was described above, the solid laser device has the off axis negative branch unstable resonance means formed in the direction of width (the direction of the plane S) of the slab-shaped laser medium 1 which has a pair of optically smooth surfaces confronted with each other with respect to the optical path, and the low order stable resonance means formed in the direction of thickness (the direction of the plane P) of the laser medium 1.

Therefore, the output laser beam 8 is small in the angle of divergence both in the direction of width (the direction of the plane S) of the laser medium 1 and in the direction of thickness (the direction of the plane P) of the same. That is, the laser beam 8 is excellent in convergence and high in power. Accordingly, the laser beam 8 can be concentrated into a fine light spot. Hence, the solid laser device can be applied to fine laser machining operations has a large range of applications.

In the above-described embodiment, in order to make the curvatures in the directions of the planes S and P different from each other in each of the mirrors forming the resonance system, the cylindrical lens 11 is disposed in front of the concave mirror 10. However, instead of the mirror having a linear curvature surface may be employed. In this case, spherical surfaces different in curvature can be formed in two directions perpendicular to each other, and therefore the cylindrical lens 11 can be eliminated, which contributes to simplification of the device.

Figure 3:
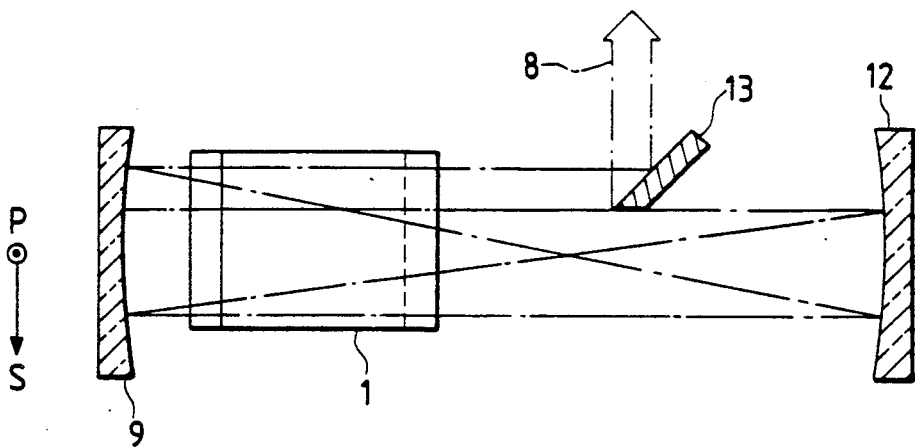
FIG. 3 is a vertical sectional view showing essential components of a solid laser device according to a second embodiment of the invention, FIGS. 4 (a) and 4 (b) are a vertical sectional view and a horizontal sectional view, respectively, showing essential components of a solid laser device according to a third embodiment of the invention.

In practice, the concave mirror 10 in the above-described first embodiment may be replaced by other means as shown in FIG. 3. FIG. 3 is a vertical sectional view showing essential components of a solid laser device according to a second embodiment of the invention. In FIG. 3, reference numerals 1, 8 and 9 designates the same parts as those in FIGS. 1 and 2.

In FIG. 3, reference numeral 12 designates a rotationally symmetric spherical concave mirror which, unlike the above-described one in the first embodiment, has no cut; 13, a coupling mirror which is disposed between the laser medium 1 and the concave mirror 12-and on one side of the S direction. The concave mirror 12 and the coupling mirror 13 function as the concave mirror 10 in the first embodiment. In this embodiment, the cylindrical lens 11 is not shown.

As is apparent from the above description, the solid laser device according to the second embodiment also has a negative branch unstable resonance means formed in the direction of width of the slab-shaped laser medium 1 (in the direction of the plane S), and a low order stable resonance means formed in the direction of thickness of the laser medium 1 (in the direction of the plane P). Thus, the output laser beam 8 is small in the angle of divergence both in the direction of width of the laser medium 1 (in the direction of the plane S) and in the direction of thickness of the same 1 (in the direction of the plane P). Furthermore the output laser beam is excellent in convergence and high in power. The solid laser device can be applied even precision laser machining operations. That is, it has a large range of applications.

In the embodiment, no cut is formed in the concave mirror 12, and accordingly the latter can be readily manufactured. In addition, the direction of the laser beam can be changed by adjusting the orientation of the coupling mirror 13.

Figure 4A:
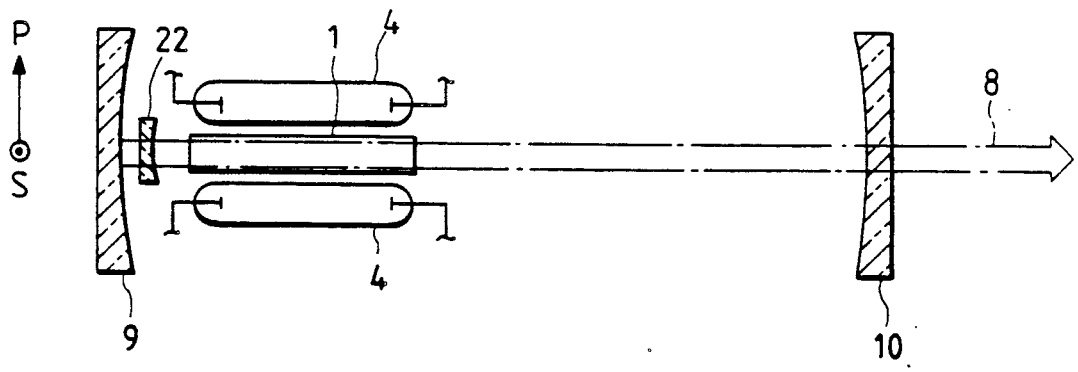
Figure 4A:
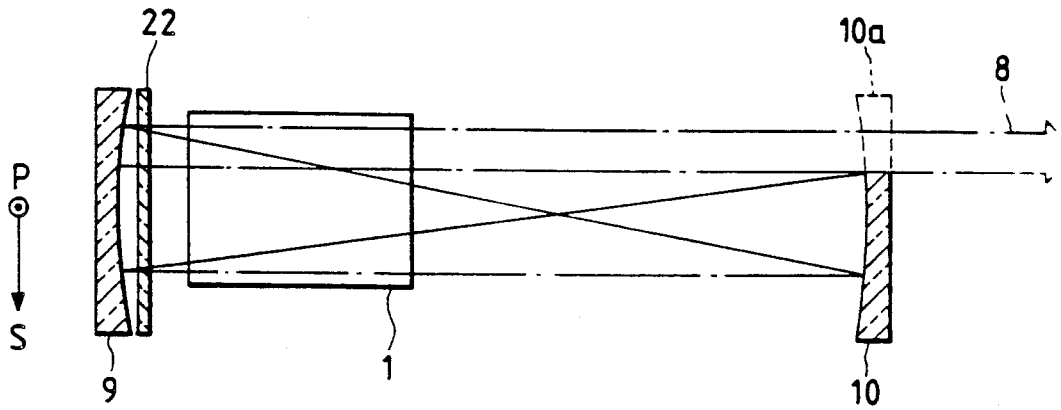

A solid laser device according to a third embodiment of the invention will be described. FIGS. 4 (a) and 4 (b) are a vertical sectional view and a horizontal sectional view, respectively, showing essential components of the solid laser device of the third embodiment. In FIG. 4, reference numerals 1, 4, 8 and 9 designate the same parts as those in FIGS. 1 through 3.

In FIG. 4, reference numeral 22 designates a linear concave lens for preventing the difficulties associated with forming a thermal lens in the laser medium (hereinafter referred to as "a thermal-lens correcting lens 22", when applicable). In the device, the laser beam 8 travels through the laser medium 1 in parallel with the optically smooth surfaces. Therefore, in the third embodiment, unlike the embodiment shown in FIG. 2, a thermal lens is formed in the laser medium 1 which strongly focuses the laser the direction of the plane P; i.e., in the direction of thickness of the laser medium 1 as the outputs of the lamps 4 increase. This difficulty is prevented by using the above-described thermal-lens correcting lens 22.

Hence, by adjusting the focal length of the thermal-lens correcting lens 22 to a suitable value, a low order stable resonance means is formed in the plane P, while a off axis negative branch unstable resonance means is formed in the plane S, when the lamps 4 provide predetermined outputs. Thus, the output laser beam 8 has a small angle of divergence both in the direction of the plane P and in the direction of the plane S. That is, the output laser beam 8 is excellent in convergence and high in power. The third embodiment has the same effects as the above-described first and second embodiments.

The above-described embodiments have their own means for outputting a laser beam small in the angle of divergence and high in power. These means may be combined to provide another solid laser device with the same effects.

Figure 5:
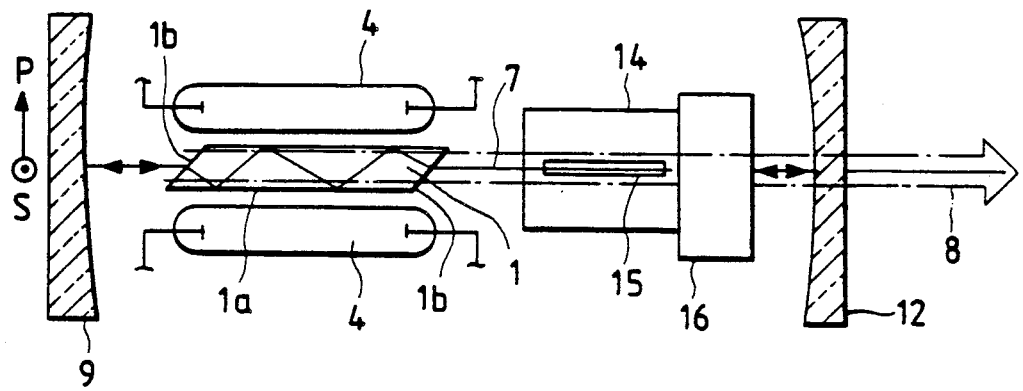
FIGS. 5 and 6 are a top view and a side view, respectively, showing the arrangement of a solid laser device according to a fourth embodiment of the invention, FIGS. 7 (a)–7 (d) are explanatory diagrams showing relationships between the contours of laser beams at sections I—I and II—II and the intensity distributions of near field images and far field images.
Figure 6:
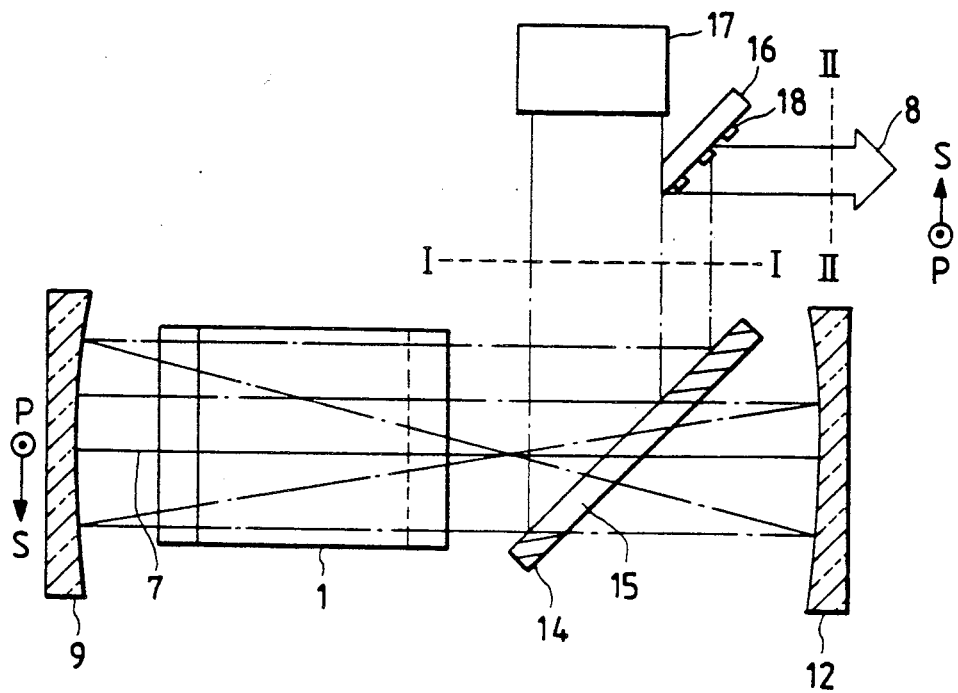

A solid laser device according to a fourth embodiment of the invention will be described with reference to FIGS. 5 and 6. FIGS. 5 and 6 are a top view and a side view, respectively, showing the arrangement of the solid laser device according to the fourth embodiment of the invention. In FIGS. 5 and 6, reference numeral 1 designates a slab-shaped laser medium made of, for example, YAG crystal. the laser medium having a pair of optically smooth surfaces 1a which are in parallel with each other, and a light beam is totally reflected from these optically smooth surfaces 1a to form a zigzag optical path in the laser medium 1; 4, lamps for supplying pumping light to the laser medium 1; 9, a first mirror disposed beside one end face 1b of the laser medium 1, the first mirror in this embodiment being a collimate mirror made up of a total reflection mirror; 12, a second mirror disposed beside the other end face 1b of the laser medium 1, the second mirror being an enlarging concave mirror made up of a total reflection mirror. The second mirror 12 and the collimate mirror 9 form a negative branch unstable resonator. Further in FIGS. 5 and 6, reference numeral 14 designates a coupling mirror positioned between the second mirror 12 and the laser medium 1, the coupling mirror 14 having a rectangular opening 15 whose center is shifted from the optical axis 7 and inclined at about 45° with respect to the optical axis 7; 16, a plane mirror for shaping the laser beam which is taken out of the unstable resonator by means of the coupling mirror 14, the plane mirror 16 being held in parallel with the coupling mirror 14; 17, a damper for absorbing the excess laser beam which is taken out of the unstable resonator by means of the coupling mirror 14. The damper 17, the coupling mirror 14 and the plane mirror 16 form beam shaping means. Phase adjusting films 18 are formed on the plane mirror 16.

The solid laser device thus organized operates as follows. The output light beams of the lamps 4 are absorbed by the laser medium 1 to pump the latter, as a result of which the laser medium 1 emits light. As was described above, the collimate mirror 9 and the enlarging mirror 12 form the negative branch unstable resonator. The laser beam reciprocating between these mirrors is amplified by the laser medium 1 and formed into a substantially parallel beam by the collimate mirror 9, which advances to the enlarging mirror 12. The light beam passed through the opening 15 of the coupling mirror 14 is reflected by the enlarging mirror 12 again so that it is reciprocated in the resonator. The laser beam reflected from the reflecting surface of the coupling mirror 14 is taken, as a parallel beam, out of the unstable resonator. A larger part of the laser beam thus taken out is allowed to emerge, as a solid (not hollow) laser beam 8, by the plane mirror 16. The excess laser beam reflected from the edge portions (in the longitudinal direction of the opening 15) of the coupling mirror 14 is absorbed by the damper 17. The solid laser beam thus obtained is focused with a lens (not shown) or the like, so as to be used for a precision laser machining operation, or the like.

In the solid laser device thus designed, the characteristics of the slab-shaped laser medium 1 are fully utilized, so that the thermal lens effect is eliminated, and a high power laser beam is outputted. In addition, the unstable resonator is formed in each of the directions P and S, and therefore the output laser beam is of a plane wave in phase, and it is extremely small in the angle of divergence, and excellent in convergence. FIGS. 7 (a)–7 (d) show relationships between the contours of laser beams at sections I—I and II—II and the intensity distributions of near field images and far field images. When the coupling mirror 14 with the rectangular opening 15 is inserted in such a manner that its center comes to the optical axis 7 of the unstable resonator made up of the collimate mirror 9 and the enlarging mirror 12, then as shown in FIG. 7 (a) hollow laser beam is obtained; that is, the outer and inner peripheries of the hollow laser beam are substantially similar to the section of the laser medium 1 and the opening 15, respectively. The hollow laser beam is substantially in the same phase. However, if the hollow laser beam is used as it is, then expansion of the laser beam appears in its far field image by diffraction. This difficulty is eliminated in the invention as follows: As shown in FIG. 7 (b), only a part of the hollow laser beam obtained with the resonator and the coupling mirror 14 in the case of FIG. 7 (a); that is, only one side (in the longitudinal direction) of the hollow laser beam is used, as a result of which a laser beam substantially in the same phase can be obtained. This laser beam is free from the difficulty that expansion of the laser beam appears in the far field image by diffraction; that is, the laser beam is excellent in convergence. Furthermore, in the above-described embodiment, the coupling mirror 14 may be shifted in such a manner that the center of the opening 15 is displaced from the optical axis in the longitudinal direction of the opening 15. In this case, as shown in FIG. 7 (c), the laser beam can be collectively obtained from the coupling mirror on one side in the longitudinal direction. When, under this condition, the plane mirror 16 is placed on the optical path, the laser beam can be obtained as a solid (not hollow) laser beam. The power of this laser beam is higher than that of the laser beam in the case of FIG. 7 (b). In addition, the laser beam is scarcely expanded in the far field image: that is, it is excellent in convergence.

Figure 8A:
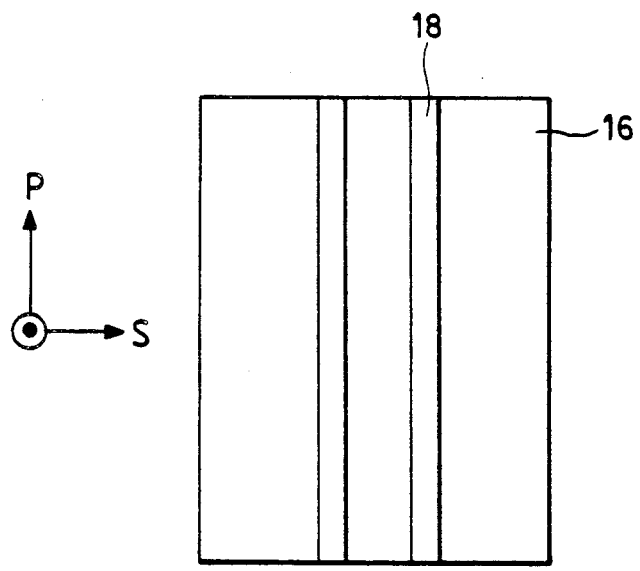
FIG. 8(a) and 8(b) is a top view and a side view, respectively, showing the structure of a phase adjusting film.
Figure 8B:
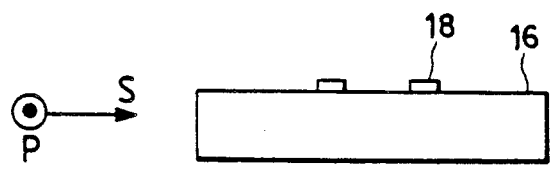

In general, the resonator in the direction of the axis P is different in Fresnel number from that in the direction of the axis S, and therefore the beams in the two directions are somewhat different in the angle of divergence from each other. Accordingly, in propagation of the laser beam 8, or focusing it with a lens, the laser beam 8 suffers from anisotropy, so that the laser machining performance is lowered. This invention eliminates this difficulty as follows: As shown in FIG. 8, phase adjustment films 18 whose thickness is about ¼ of the laser beam wavelength are formed on the plane mirror 16, so that the angle of divergence of the laser beam 8 in the direction of the axis S is suitably shifted, thereby to eliminate the anisotropy of the laser beam. In other words, the wave surface in the direction in which the angle of divergence is small is shifted with the phase adjustment films, as a result of which the anisotropy is eliminated, and the laser machining performance is improved as much.

Figure 9:
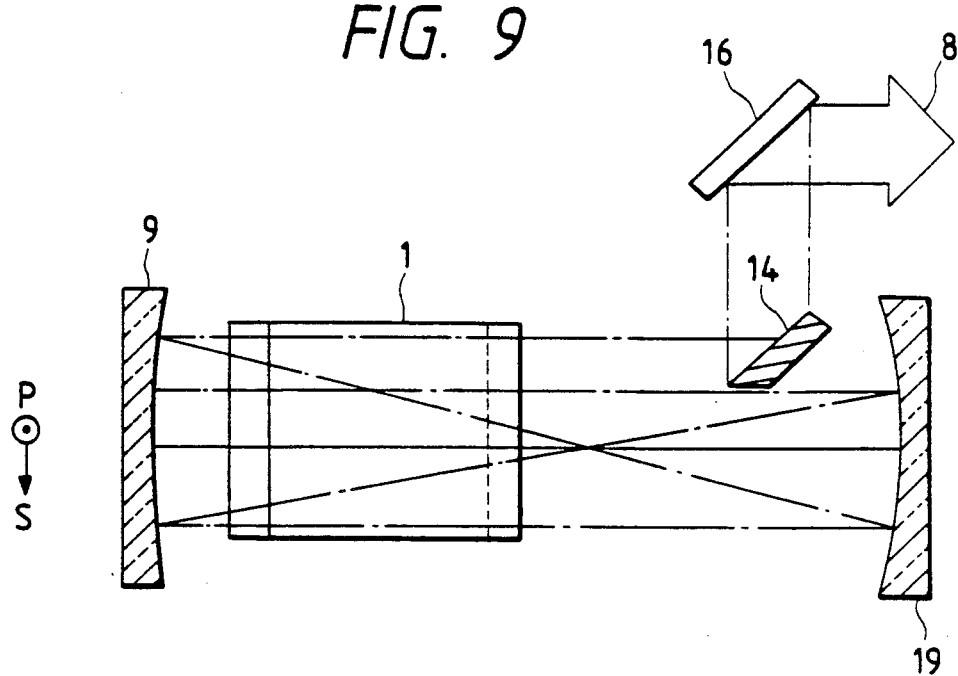
FIG. 9 is a side view showing the arrangement of a fifth embodiment of the invention.
Figure 10:
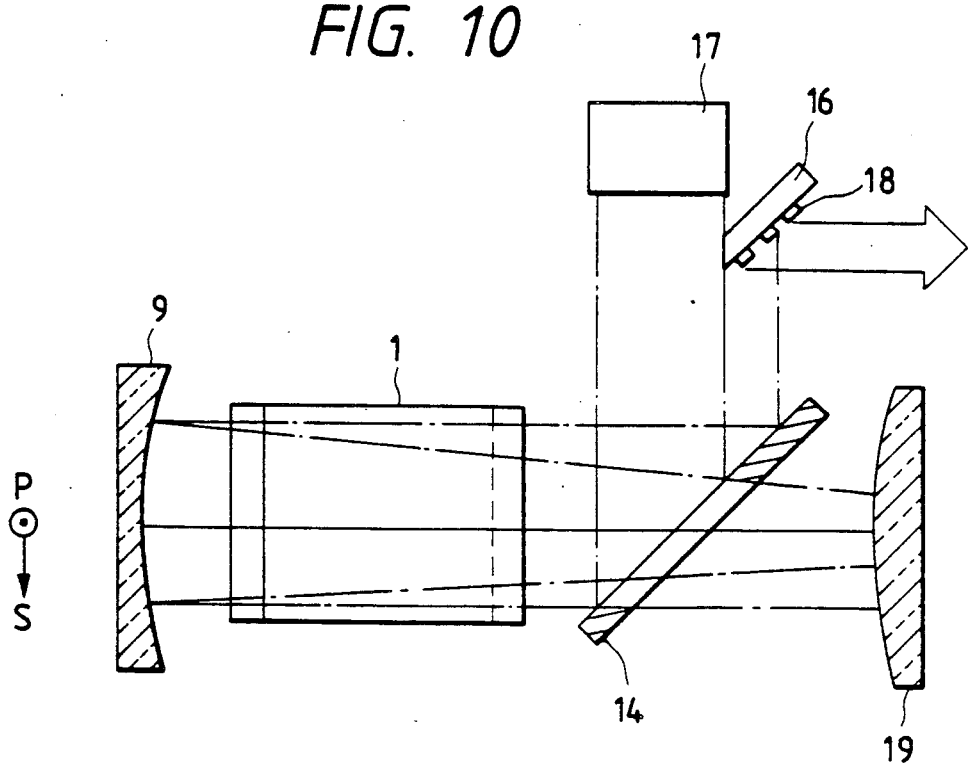
FIG. 10 is a side view showing the arrangement of a sixth embodiment of the invention, FIG. 11 (a) is a side view showing the arrangement of a seventh embodiment of the invention, FIG. 11 (b) is a sectional view taken along line III—III.

FIGS. 9 and 10 show fifth and sixth embodiments of the invention, respectively. As in a solid laser device shown in FIG. 9, the coupling mirror 14 forming the beam shaping means may be a simple plane mirror instead of the mirror with the opening 15, if the plane mirror is so positioned as to take out part of the parallel laser beam in the unstable resonator. The solid laser device thus designed has the same effects as those which have been described above. In a solid laser device shown in FIG. 10, an enlarging convex mirror 19 is employed as the second mirror, which forms a positive branch unstable resonator with the collimate mirror 9. It goes without saying that the solid laser device thus constructed has the same effects as those described above.

FIGS. 11 (a) and 11 (b) show a seventh embodiment of the invention. The seventh embodiment is different from the fourth embodiment shown in FIGS. 5 and 6 in the following points: The second mirror is an enlarging mirror which comprises: a transparent substrate of glass or the like; a rectangular reflecting film 20 formed on the substrate in such a manner that its center is displaced from the optical axis 7; and a non-reflecting film 21 formed around the reflecting film 20. A damper 17 is confronted through the enlarging mirror 12 with the laser medium 1. The second mirror forms part of the unstable resonator, and forms the beam shaping means with the damper 17.

In the solid laser device thus designed, the laser beam amplified by the laser medium 1 is formed into a parallel laser beam by the collimate mirror 9. That is, a rectangular laser beam as indicated by the one-dot chain line in FIG. 11 (b) is applied to the enlarging mirror 12. A part of the rectangular laser beam is reciprocated in the resonator by the reflecting film 20, and the remaining is taken out of the resonator through the non-reflecting film 21. An excess part of the laser beam thus taken out, which passes through the edge portions (in the longitudinal direction) of the reflecting film 20, is absorbed by the damper 17, so that a solid (not hollow) laser beam 8 is outputted. The solid laser beam 8 is obtained without a coupling mirror 14. The solid laser device has the same effects as those which have been described above, and it can be simplified in construction, and it can be manufactured at lower cost.

Figure 12:
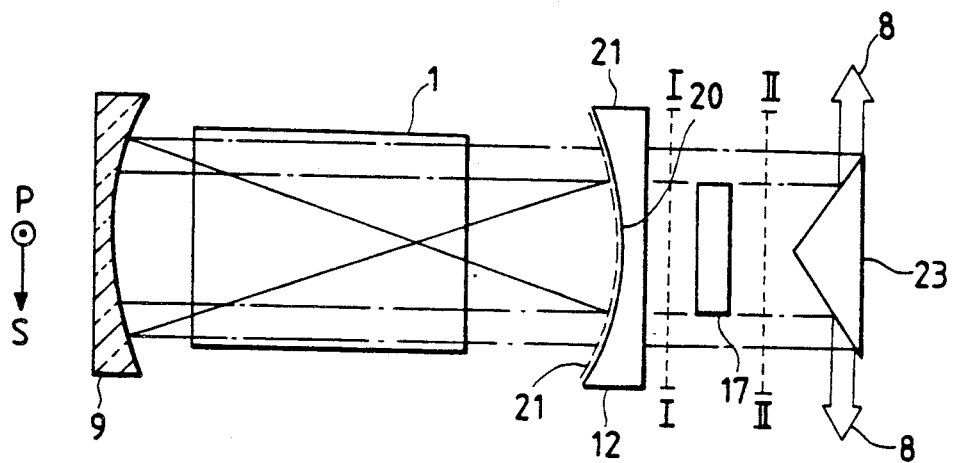
FIG. 12 is a side view showing the arrangement of an eighth embodiment of the invention.
Figure 11A:
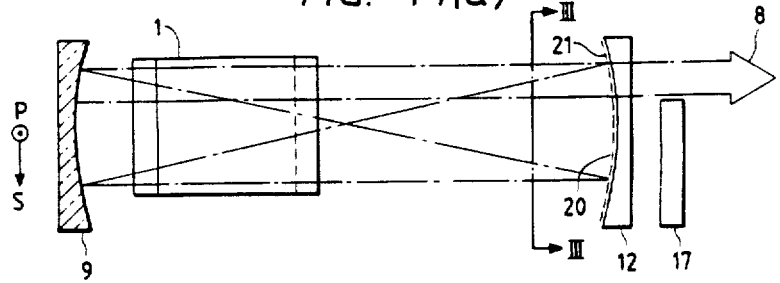
Figure 11B:
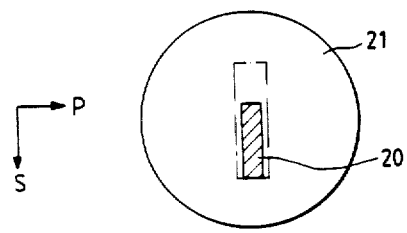
Figure 12:
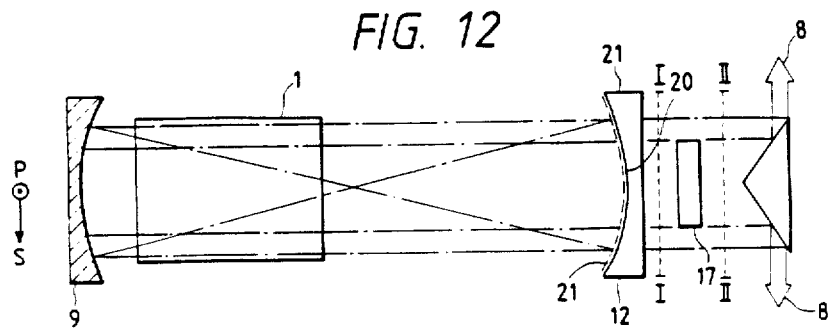

An eighth embodiment of the invention is as shown in FIG. 12. The eighth embodiment is different from the above-described seventh embodiment in the following points: The center of a rectangular reflecting film 20 of an enlarging mirror, which is the second mirror in the eighth embodiment, is on the optical axis 7. The damper 17 is smaller in the direction of the axis S than that in the seventh embodiment, and is positioned behind the rectangular reflecting film 20. In addition, a mirror 23 is provided to reflect two independent laser beams in two different directions. In the solid laser device thus designed, a hollow laser beam is taken out of the unstable resonator by means of the enlarging mirror 12, and its excess part is absorbed by the damper 17, and then it is formed into two laser beams. The two laser beams are bent by the direction changing mirror 23 in two different directions, so that they are employed as two independent laser beams for laser machining operations or the like. FIG. 7 (d) shows relationships between the contours of laser beams at sections I—I and II—II and the intensity distributions of a near field image and a far field image in the eighth embodiment. As is apparent from FIG. 7 (d), the solid (not hollow) laser beams 8 are used individually, and therefore the laser beams are not expanded in the far field image by diffraction; that is, they are excellent in convergence.

As was described above, this invention relates to a solid laser device with a slab-shaped laser medium. One example of the solid laser device according to the invention, comprises: the slab-shaped laser medium having one pair of optically smooth surfaces confronting each other through the optical path; the first and second mirrors arranged on the optical path in such a manner that the first and second mirrors are confronted with each other through the laser medium; the resonance means which forms the unstable resonator in the direction of width of the laser medium, and the low order stable resonator in the direction of thickness of the laser medium; and the laser beam emergence means for taking a laser beam out of the resonance means and outputting the laser beam from the device. Another example of the solid laser device according to the invention comprises: the slab-shaped laser medium having a pair of optically smooth surfaces confronting each other through the optical path; the first and second mirrors arranged on the optical path in such a manner that the first and second- mirrors are confronted with each other through the laser medium; the resonance means which forms the unstable resonators in the direction of width of the laser medium and in the direction of thickness of the same; and the laser beam emergence means for taking a laser beam out of the resonance means and outputting the laser beam from the device. Hence, the solid laser devices according to the invention can output a high power laser beam excellent in convergence, and accordingly they are applicable to precision laser machining operations.

What is claimed is:

1. A solid laser device, comprising:
   a slab-shaped laser medium having a pair of optically smooth surfaces which are parallel with each other and define an optical path therebetween;
   first and second totally reflective mirrors arranged on said optical path in such a manner that said first and second mirrors are confronted with each other through said laser medium;
   means for resonating a laser beam, including an off-axis unstable resonator in a direction of width of said laser medium, and a stable resonator in a direction of thickness of said laser medium; and
   laser beam emergence means for outputting a portion of said laser beam from said device.

2. The solid laser device of claim 1, wherein said laser beam emergence means constitutes a cut-out portion in one of said mirrors through which said portion of said laser beam is output.

3. The solid laser device of claim 1, further comprising a reflecting film and a non-reflecting film formed on said second mirror, such that said portion is taken out through said non-reflecting film.

4. The solid laser device of claim 1, further comprising a cylindrical lens positioned between one of said mirrors and the laser medium.

5. The solid laser device of claim 1, wherein said laser beam emergence means comprises a totally reflective coupling mirror to output said laser beam portion.

6. The solid laser device of claim 1, wherein said laser beam emergence means comprises a coupling mirror positioned to contact only said laser beam portion to be output.

7. The solid laser device of claim 1, further comprising a thermal-lens correcting lens, which strongly defocuses said laser beam in a direction of thickness of said laser beam.

8. The solid laser device of claim 1, further comprising a coupling mirror having totally transmissive and totally reflective portions, said totally reflective portion constituting said laser beam emergence means.

9. A solid laser device, comprising:
   a slab-shaped laser medium having a pair of optically smooth surfaces which are parallel with each other and define an optical part therebetween;
   first and second totally reflective mirrors arranged on said optical path in such a manner that said first and second mirrors are confronted with each other through said laser medium;
   means for resonating a laser beam, including a negative branch unstable resonator in a direction of width of said laser medium, and a stable resonator in a direction of thickness of said laser medium; and
   laser beam emergence means for taking a portion of the laser beam out of said resonance means and outputting said laser beam portion from said device independently of a polarization of the portion.

10. The solid laser device of claim 9, wherein said laser beam emergence means constitutes a cut-out portion in one of said mirrors through which said portion of said laser beam is output.

11. The solid laser device of claim 9, further comprising a reflecting film and a non-reflecting film formed on said second mirror, said portion of said laser bean being taken out through said non-reflecting film.

12. The solid laser device of claim 9, further comprising a cylindrical lens positioned between one of said mirrors and the laser medium.

13. The solid laser device of claim 9, wherein said laser beam emergence comprises a totally reflective coupling mirror to output said laser beam portion.

14. The solid laser device of claim 9, wherein said laser beam emergence means comprises a coupling mirror positioned to contact only said laser beam portion to be output.

15. The solid laser device of claim 9, further comprising a thermal-lens correcting lens, which strongly defocuses said laser beam in a direction of thickness of said laser beam.

16. The solid laser device of claim 9, further comprising a coupling mirror having totally transmissive and totally reflective portions, said totally reflective portion constituting said laser beam emergence means.

17. A solid laser device, comprising:
   a slab-shaped laser medium having a pair of optically smooth surfaces which are parallel with each other and define an optical path;
   first and second totally reflective mirrors arranged on said optical path in such a manner that said first and second mirrors are confronted with each other through said laser medium;
   means for resonating a laser beam, including an off-axis negative branch unstable resonator in a direction of with of said laser medium, and a low order stable resonator in a direction of thickness of said laser medium; and
   laser beam emergence means for taking a portion of the laser beam out of said resonance means and outputting said laser beam portion from said device.

18. The solid laser device of claim 17, wherein said laser beam emergence means constitutes a cut-out portion in one of said mirrors through which said portion of said laser beam is output.

19. The solid laser device of claim 17, further comprising a reflecting film and a non-reflecting film formed on said second mirror, said portion of said laser beam being taken out through said non-reflecting film.

20. The solid laser device of claim 17, further comprising a cylindrical lens positioned between one of said mirrors and the laser medium.

21. The solid laser device of claim 17, wherein said laser beam emergence means comprises a totally reflective coupling mirror to output said laser beam portion.

22. The solid laser device of claim 17, wherein said laser beam emergence means comprises a coupling mirror positioned to contact only said laser beam portion to be output.

23. The solid laser device of claim 17, further comprising a thermal-lens correcting lens which strongly defocuses said laser beam in a direction of thickness of said laser beam.

24. The solid laser device of claim 17, further comprising a coupling mirror having totally transmissive and totally reflective portions, said totally reflective portion constituting said laser beam emergency means.

25. A solid laser device, comprising:
- a slab-shaped laser medium having a pair of optically smooth surfaces which are parallel with each other and define an optical path;
- first and second totally reflective mirrors arranged on said optical path in such a manner that said first and second mirrors are confronted with each other through said laser medium;
- means for resonating a laser beam, comprising an unstable resonator in a direction of width of said laser medium, and an unstable resonator in a direction of thickness of said laser medium; and
- laser beam emergence means for taking a portion of the laser beam out of said resonance means and outputting said laser beam portion from said device;
- wherein said laser beam emergence means includes beam shaping means for shaping said laser beams into a solid laser beam.

26. The solid laser device of claim 25, wherein said laser beam emergence means comprises a totally reflective coupling mirror to output said laser beam portion.

27. The solid laser device of claim 25, wherein said laser beam emergence means comprises a coupling mirror positioned to contact only said laser beam portion to be output.

28. The solid laser device of claim 25, further comprising a coupling mirror having totally transmissive and totally reflective portions, said totally reflective portion constituting said laser beam emergence means.

29. The solid laser device of claim 25, further comprising a damper for absorbing an excess part of said portion of said laser beam outputted from said device, and a plane mirror, said damper and plane mirror constituting said beam shaper means.

30. The solid laser device of claim 29, further comprising an adjusting film formed on said plane mirror.

* * * * *

UNITED STATES PATENT AND TRADEMARK OFFICE
CERTIFICATE OF CORRECTION

PATENT NO. : 5,125,001　　　　　　　　　　　　　　　　Page 1 of 2

DATED : June 23, 1992

INVENTOR(S) : Shigenori Yagi et al

Figure 11A:
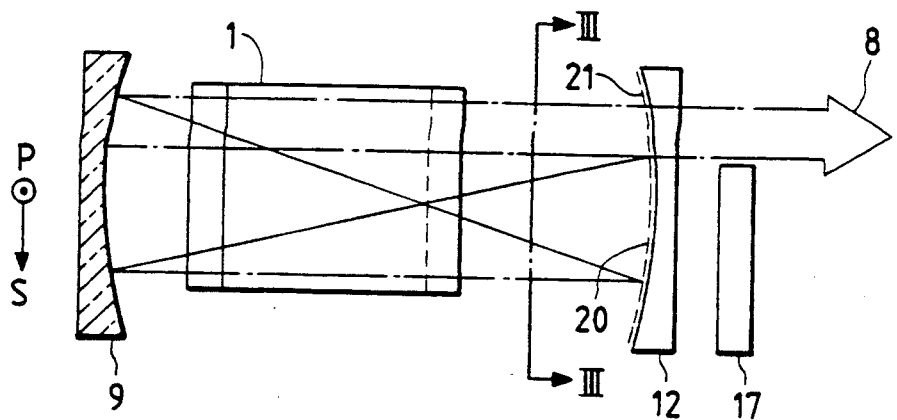
Figure 11B:
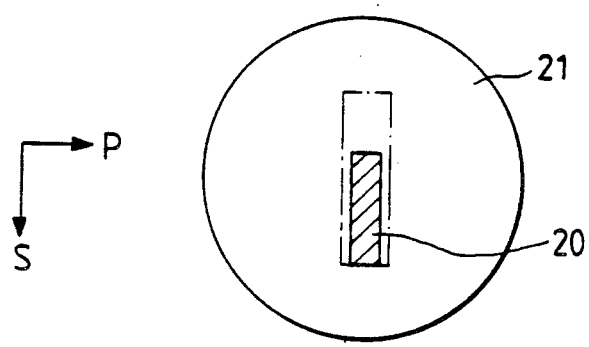

It is certified that error appears in the above-identified patent and that said Letters Patent is hereby corrected as shown below:

The drawing sheet, consisting of Figs. 11(a) and Fig. 12, should be deleted to be replaced with the drawing sheet, consisting of Figs. 11(a) and Fig. 12, as shown on the attached page.

Signed and Sealed this

Ninth Day of November, 1993

*Attest:*

BRUCE LEHMAN

*Attesting Officer*　　　　*Commissioner of Patents and Trademarks*